(12) United States Patent
Kristensen

(10) Patent No.: US 8,701,369 B2
(45) Date of Patent: Apr. 22, 2014

(54) TOWER, A WIND TURBINE AND A METHOD FOR ARRANGING A PLATFORM INSIDE A TOWER

(75) Inventor: Jonas Kristensen, Skjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 13/167,385

(22) Filed: Jun. 23, 2011

(65) Prior Publication Data

US 2011/0252720 A1   Oct. 20, 2011

Related U.S. Application Data

(63) Continuation of application No. 12/619,992, filed on Nov. 17, 2009, now abandoned.

(60) Provisional application No. 61/115,198, filed on Nov. 17, 2008.

(30) Foreign Application Priority Data

Nov. 17, 2008 (DK) ................................. 2008 01594

(51) Int. Cl.
 *E04H 12/00* (2006.01)
 *E04C 5/08* (2006.01)
(52) U.S. Cl.
 USPC ............................. 52/651.01; 52/40; 52/223.4
(58) Field of Classification Search
 USPC ........... 52/40, 745.17, 651.01, 745.18, 223.3, 52/223.4, 229, 231, 256; 405/229, 231, 405/256; 182/150
 See application file for complete search history.

(56) References Cited

U.S. PATENT DOCUMENTS 2,011,018 A * 8/1935 Smith .............................. 454/45
3,095,060 A   6/1963 Reinhardt
(Continued)

FOREIGN PATENT DOCUMENTS

EP   1 933 029   6/2008
ES   2 196 977   12/2003
(Continued)

OTHER PUBLICATIONS

Sanne H. Skovborg; 1st Technical Examination and Search Report issued in priority Denmark Application No. PA 2008 01594; Jun. 16, 2009; 5 pages; Denmark Patent and Trademark Office.
(Continued)

*Primary Examiner* — Ryan Kwiecinski
(74) *Attorney, Agent, or Firm* — Patterson & Sheridan, LLP

(57) ABSTRACT

This invention relates to a tower for a wind turbine, comprising one or more tubular tower sections, having an outer jacket wall and an inward directed flange in its lower and upper ends, and at least one platform arranged inside the tower for facilitating access for maintenance and repairs to the inner of the tower and to the nacelle. The tower also comprises a support structure including at least three elongated tensile load carrying members, which each is attached in its upper end to the upper flange of the tower section and in its lower end to the lower flange of the tower section and which supports one or more platforms that are suspended by the tensile load carrying members while at least one ladder is attached to the platforms. The at least one ladder is stabilized in the horizontal direction by transversal tensile load carrying members extending from the ladder to the tensile load carrying members that are vertically arranged between the upper and lower flanges. The invention also relates to a method for arranging a platform inside a tower.

20 Claims, 3 Drawing Sheets

(56) References Cited

U.S. PATENT DOCUMENTS

| | | | |
|---|---|---|---|
| 3,768,016 A | 10/1973 | Townsend et al. | |
| 3,960,242 A | 6/1976 | Saxonmeyer | |
| 3,967,699 A | 7/1976 | Jasch | |
| 4,483,033 A | 11/1984 | Gebert | |
| 6,467,233 B1 | 10/2002 | Maliszewski et al. | |
| 6,470,645 B1* | 10/2002 | Maliszewski et al. | 52/745.18 |
| 6,640,928 B1* | 11/2003 | Ridley, Jr. | 182/68.1 |
| 6,713,891 B2 | 3/2004 | Kirkegaard et al. | |
| 7,739,843 B2* | 6/2010 | Cortina-Cordero | 52/223.5 |
| 7,762,037 B2* | 7/2010 | Meiners | 52/651.01 |
| 7,928,593 B2 | 4/2011 | Ollgaard | |
| 8,181,748 B2* | 5/2012 | Christensen | 187/245 |
| 2003/0147753 A1* | 8/2003 | Ollgaard | 416/244 A |
| 2004/0244326 A1 | 12/2004 | Ollgaard | |
| 2005/0150721 A1* | 7/2005 | Fujiwara et al. | 182/48 |
| 2005/0166521 A1* | 8/2005 | Silber | 52/633 |
| 2006/0131107 A1* | 6/2006 | Duguay | 182/150 |
| 2007/0125037 A1* | 6/2007 | Meiners | 52/720.1 |
| 2007/0199769 A1* | 8/2007 | Chesness et al. | 182/115 |
| 2009/0016897 A1* | 1/2009 | Olgaard | 416/244 R |
| 2009/0031668 A1* | 2/2009 | Llorente Gonzalez | 52/745.17 |
| 2009/0142178 A1* | 6/2009 | Nieuwenhuizen | 415/2.1 |
| 2009/0223139 A1* | 9/2009 | Meiners | 52/40 |
| 2010/0186342 A1 | 7/2010 | Ollgaard | |
| 2010/0325986 A1* | 12/2010 | Garc A Maestre et al. | 52/223.3 |
| 2011/0252738 A1 | 10/2011 | Øllgaard | |

FOREIGN PATENT DOCUMENTS

| | | |
|---|---|---|
| ES | 2196977 A1 | 12/2003 |
| WO | 02/38953 | 5/2002 |
| WO | 200238953 | 5/2002 |
| WO | 2004/099609 | 11/2004 |
| WO | 2008/000265 | 1/2008 |
| WO | 2008/055576 | 5/2008 |

OTHER PUBLICATIONS

Sanne H. Skov Borg; 2nd Technical Examination Report issued in priority Denmark Application No. PA 2008 01594; Aug. 3, 2010; 2 pages; Denmark Patent and Trademark Office.

USPTO, Office Action issued in related U.S. Appl. No. 13/167,379 dated Sep. 19, 2012.

USPTO, final Office Action issued in related U.S. Appl. No. 12/619,992 dated Aug. 4, 2011.

USPTO, Office Action issued in related U.S. Appl. No. 12/619,992 dated Jan. 18, 2011.

USPTO, Office Action issued in related U.S. Appl. No. 13/167,379 dated Sep. 23, 2011.

USPTO, Notice of Allowance issued in related U.S. Appl. No. 12/619,992 dated Jun. 28, 2012.

European Search Report, Application No. 09175923.3-1267 / 2187050, dated Feb. 17, 2013, European Patent Office, Netherlands.

European Search Report, Application No. 11176726.5-1607 / 2385250, dated Feb. 11, 2013, European Patent Office, Netherlands.

\* cited by examiner

TOWER, A WIND TURBINE AND A METHOD FOR ARRANGING A PLATFORM INSIDE A TOWER

CROSS-REFERENCE TO RELATED APPLICATIONS

This application is a continuation of U.S. application Ser. No. 12/619,992 filed Nov. 17, 2009, which claims priority under 35 U.S.C. §119(a) to DK Application No. PA 2008 01594, filed Nov. 17, 2008, and also claims the benefit of U.S. Provisional Application No. 61/115,198, filed Nov. 17, 2008. Each of these references is incorporated by reference herein in its entirety.

TECHNICAL FIELD

The present invention generally relates to a tower for a wind turbine, comprising one or more tubular tower sections having an outer jacket wall and an inward directed flange in its lower and upper ends, and at least one platform arranged inside the tower for facilitating access for maintenance and repairs to the inner of the tower and to the nacelle.

The invention also relates to a wind turbine comprising such a tower and a method for arranging platforms and ladders inside a tower of a wind turbine.

BACKGROUND

Towers of the kind mentioned above are commonly used in wind turbines for supporting a nacelle, including a generator driven by rotor blades, on a desired level above the ground or surface of the water in case of an offshore wind turbine. The tower comprises one or more tubular tower sections of steel having a circumferential jacket wall. The tower sections normally have a circular cross section but also other cross sectional shapes could be conceivable, such as an oval shape. Moreover, the tower can optionally be cylindrical or slightly truncated conical. Each tower section is formed with an inward directed flange in its lower and upper ends. In case the tower is composed of two or more tower sections, the sections are interconnected end to end by means of a bolt connection through the flanges. Also, the tower is mounted to a foundation by means of a bolt connection through the flange in the lower end of the lower tower section, and the nacelle is mounted to the tower by means of a bolt connection through the flange in the upper end of the upper tower section.

In a lower portion of the tower, a door is arranged through the jacket wall and inside the tower is provided with support structures and access equipment, such as platforms and ladders in order to allow access to the inner of the tower for maintenance and repairs of the inside of the tower and of the equipment inside the nacelle in top of the tower.

In prior art it is known to mount the platforms on the inside of the tower by means of bolting and/or welding to the jacket wall. For example by welding brackets to the inside jacket wall on which the platforms rest. The ladders are thereafter secured to the platforms. One disadvantage with such a solution is that the jacket wall will be weakened when the platforms are attached by bolting and/or welding, which might necessitate an increased material thickness in the jacket wall and hence increased costs. Another disadvantage is that this method of attaching platforms and ladders inside the tower, is not flexible in the sense that a possible adjustment or repositioning in the future will be very difficult. Such a rigid mounting may also affect the tower with unfavourable loads.

EP 1933029 discloses a method for mounting platforms and ladders inside a tower for a wind turbine. This method involves the use of beams, which are secured to the upper as well as the lower flange of each tower section. To the beams are, in its turn, mounted support structures such as platforms and ladders. The beams are attached to the upper flange in a rigid way by means of bolting or welding. The attachment to the lower flange, however, allows displacement of the beam in the longitudinal direction in relation to the flange, whereas the beam is fixed held in a direction perpendicular to its longitudinal direction in order to allow displacement of the beams, due to e.g. varying temperatures and deflection of the tower due to wind load, but ensure stability in the horizontal direction. The use of beams extending between the upper and lower flange of each tower section, is however a rather expensive solution for mounting equipment inside a tower and it is not as flexible as is desirable since the equipment are attached to the beams by means of e.g. bolting or welding, and as soon as any of the equipment are to be adjusted or repositioned, it is necessary to drill new holes in the beams or to make a new welding, which is time-consuming and elaborating.

It is also known in the art to attach an upper platform by means of rods from the upper flange of a tower section, such that the platform is suspended from the upper flange. A ladder is thereafter suspended from the platform and is stabilized by means of wires or the like, which are attached to the inside of the jacket wall by means of magnets. Such a solution has the advantage that it does not weaken the jacket wall. However, the possible alternatives for arranging equipment inside the tower section is very limited. Especially when it is desirable to arrange several platforms inside the same tower section.

SUMMARY

In view of the above, an objective of the invention is to provide a tower for a wind turbine, in which platforms and other equipment may be arranged inside the tower in a cost effective and highly flexible way without weakening the tower structure. At least this objective is achieved by a tower according to claim 1.

The invention also relates to a method for arranging platforms inside a tower of a wind turbine and a wind turbine comprising such a tower, having essentially the same objective as above. This objective is achieved by a method according to claim 10 and a wind turbine according to claim 12.

Accordingly, the basis of the invention is the insight that the above objective may be achieved by arranging, inside the tower, tensile load carrying members, which each is in an upper end attached to an upper flange of a tower section and in a lower end is attached to a lower flange of the tower section. At least one platform is attached, by any suitable means, to the tensile load carrying members and positioned at a desirable level inside the tower. The number of tensile load carrying members has to be at least three in order to balance the platform. However, a considerable larger number of tensile load carrying members could be conceivable, such as e.g. between four and twenty.

Within this overall idea, the invention may be varied in many different ways. For example, the tensile load carrying members can be designed in many different ways and be made of different materials. Accordingly, the tensile load carrying members can be formed as metal wires or chains, i.e. highly flexible members. It would also be possible to use ropes of different materials, preferably synthetic materials, such as carbon fiber, in order to prevent organic decomposition which is a risk when using organic materials. It is also possible to use ropes or wires being composed of a mixture of metallic and synthetic materials. However, it is within the scope of the invention to use also metallic rods, which are not highly flexible as wires, chains and ropes but which are adapted solely to carry tensile loads but not compressive loads to any appreciable extent. One advantage with using flexible tensile load carrying members, is that they can be handled easily, e.g. when introducing the members through narrow passages, such as the door opening at the bottom of the tower of a wind turbine. By using members adapted solely for carrying tensile loads, it is possible to use members having a considerably smaller cross sectional area than using a member adapted also for carrying compressive loads. This will have to result that the material content of the support structure will be smaller, the costs lower and the space requirements will be smaller.

The connection means for connecting equipment to the tensile load carrying members can be formed in many different ways. When using wires, ropes and rods, the connection means are preferably formed as clamp connections which locks by means of friction, whereas when using chains it is possible to use a connection means which engages in one or more chain links.

The arrangement of the tensile load carrying members can be designed in many different ways. Generally, it is preferred that the tensile load carrying members are attached by means of bolts or the like through holes in the upper as well as the lower flange of the tower section. It is also preferred that each tensile load carrying member is tensioned by a suitable pre-stressing force between the upper and lower flanges. In this way the platforms and other equipment suspended in the tensile load carrying members will achieve some stabilization also in the horizontal direction. However, as in the hereinafter described and illustrated embodiment, it is preferred that an appropriate number of buffers or the like, are arranged around the periphery of each platform and which absorbs impacts, between the platform and the inside of the jacket wall of the tower, due to lateral movements of the platform. The buffers should not permanently bear against the jacket wall since the platform should be able to move slightly up and down inside the tower due to varying temperatures and loads.

Moreover, when arranging two or more platforms within the same tower section, the load from the platforms can be distributed in different ways to the tensile load carrying members. For example, all of the tensile load carrying members may collectively carry all the platforms. However, it is also possible that different tensile load carrying members carries different platforms, e.g. an upper platform is carried by three or more tensile load carrying members, a lower platform is carried by different three or more tensile load carrying members, an additional lower platform is carried by additional three or more tensile load carrying members, and so on.

When arranging ladders inside the tower, it is preferred that these are suspended from the platforms. However, it would be conceivable to suspend also the ladders in the tensile load carrying members, directly in the flanges, or as a combination of all three of these connection modes. As in a hereinafter described and illustrated embodiment, the ladders can be stabilized in the horizontal direction by transversal tensile load carrying members, which are horizontally or diagonally extended between two of the tensile load carrying members extending vertically between the upper and lower flanges.

Although the invention hereinafter is described and illustrated in relation to a land-based wind turbine being assembled of two truncated conical tower sections, it is to be understood that the invention also is applicable to other types of wind turbines, such as off-shore wind turbines, having cylindrical tower sections and comprising an arbitrary number of tower sections, such as also only one tower section. The invention also offers good opportunities to attach also other types of equipment to the tensile load carrying members, such as lights and electrical cables.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION

Figure 1:
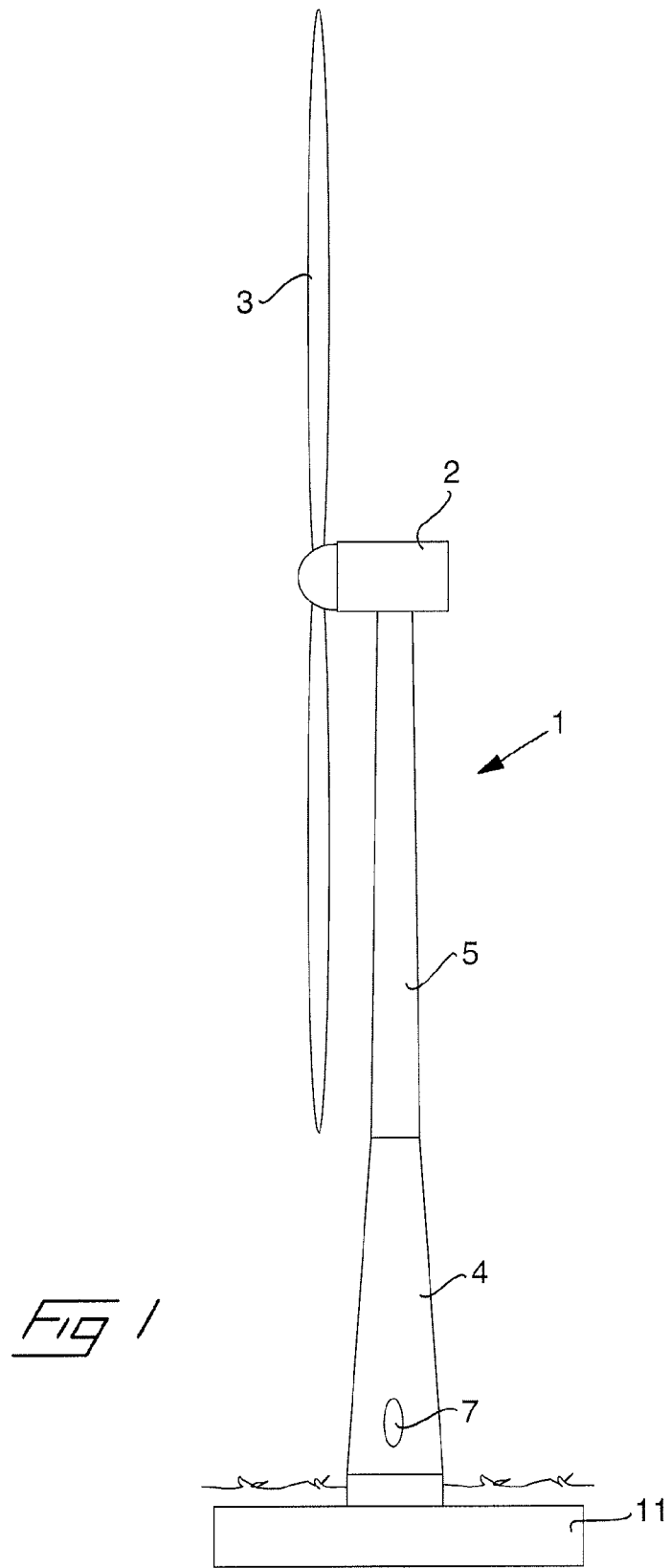
FIG. 1 diagrammatically illustrates an exemplary wind turbine.

Reference is first made to FIG. 1 of the drawings, in which is illustrated an example of a wind turbine, which comprises a tower 1, a nacelle 2 on top of the tower and rotor blades 3. In this embodiment the tower is assembled of two separate tower sections, more precisely a lower tower section 4 and an upper tower section 5, which are interconnected end to end by means of a bolt connection. Moreover, the tower sections have a truncated conical shape, wherein the lower tower section being slightly more conical than the upper tower section.

Figure 2:
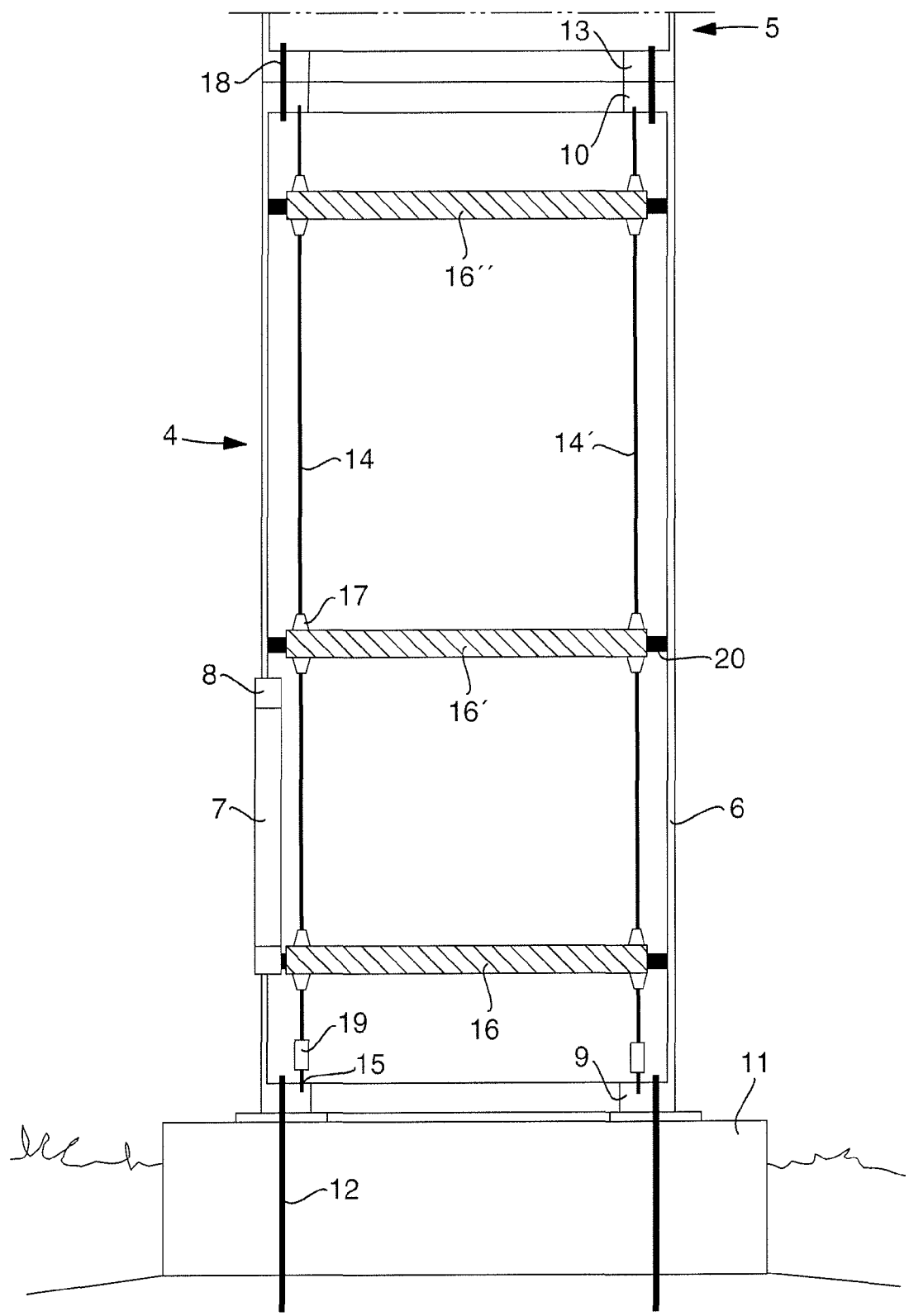
FIG. 2 diagrammatically illustrates a longitudinal section through a tower section.
Figure 3:
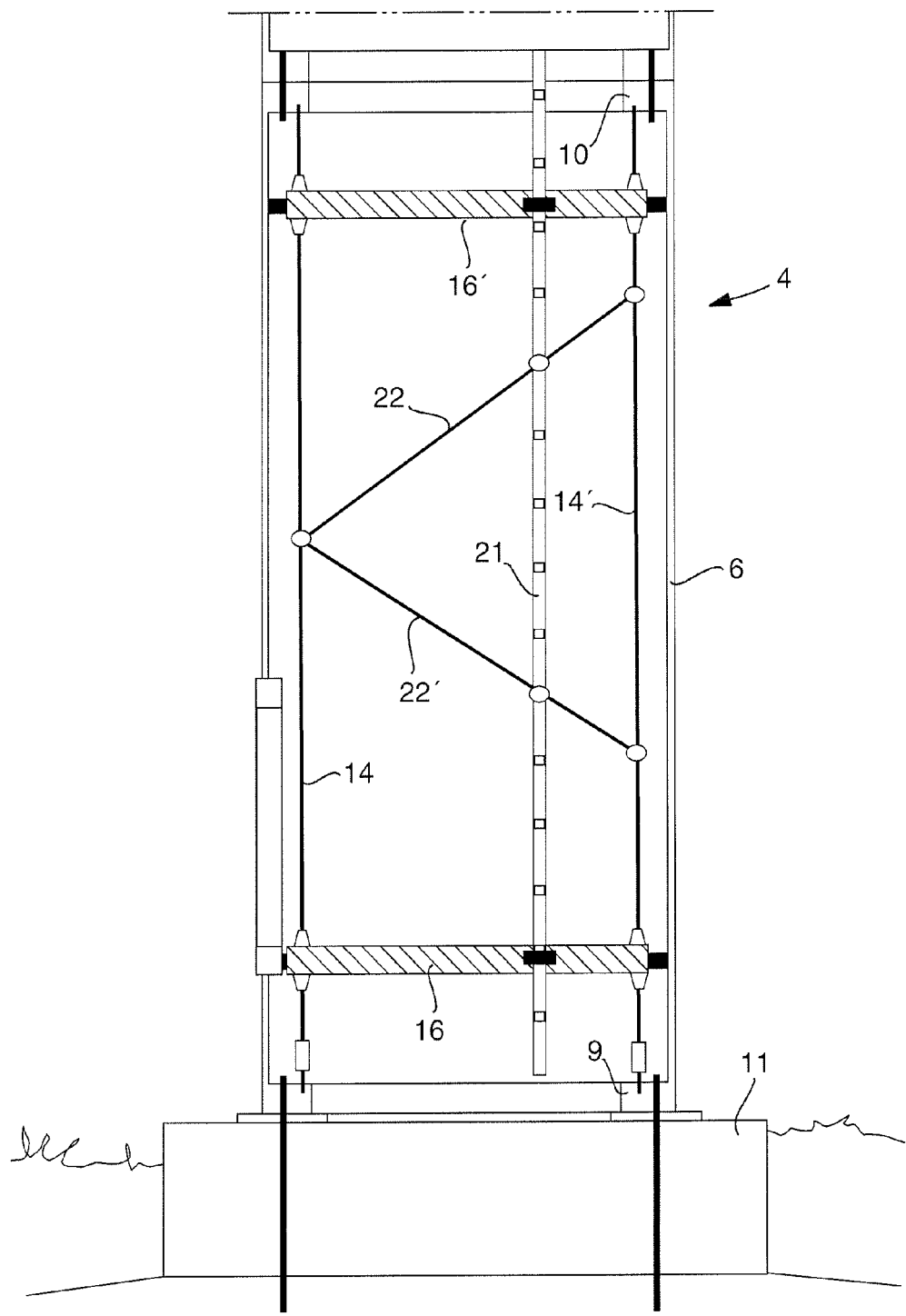
FIG. 3 diagrammatically illustrates a longitudinal section according to FIG. 2 having a different arrangement of the platforms as well as a ladder.

Each tower section is tubular and has a circumferential jacket wall 6, as is seen in FIGS. 2 and 3, preferably made of steel. To allow access to the inside of the tower for maintenance and repairs of the tower as well as the nacelle 2, a door opening with a closable door 7 is arranged in a lower portion of the lower tower section 4.

Reference is then made to FIG. 2 for description of the interior of an example of a lower tower section 4 arranged according the invention. It is to be noted that the tower section depicted in FIGS. 2 and 3 are cylindrical for the sake of simplicity and not truncated conical as in the embodiment of FIG. 1. However, the invention can just as well be applicable in a tower section having a truncated conical shape.

Both of the longitudinal sections according to FIGS. 2 and 3, are of a lower tower section having the door 7 positioned to the left in a lower portion. The area of the jacket wall 6 closest to the door has an increased wall thickness 8 in order to compensate for the weakening of the tower section caused by the door opening. In the upper as well as the lower end of the tower section, it is provided with an inward directed lower flange 9 and upper flange 10, respectively. The tower section is in its lower end connected to a foundation 11 by means of a bolt connection 12 through the lower flange 9. In the upper end it is connected to an upper tower section 5, a part of which is illustrated in the drawings, by means of a bolt connection 18 through the upper flange 10 of the lower tower section 4 and a lower flange 13 of the upper tower section 5.

According to the invention, the tower section is provided with three or more tensile load carrying members 14, 14', of which only two are illustrated in the drawings. More precisely, each tensile load carrying member is attached with one end in the upper flange 10 and the other end in the lower flange 9. The connection to the flanges can for example be achieved by means of an externally threaded shaft 15 in each end of the tensile load carrying member 14, 14', which are screwed into internally threaded holes in each flange.

In the illustrated embodiment in FIG. 2, three platforms 16, 16', 16" are arranged inside the tower section, and each of them is suspended in each of the tensile load carrying members 14, 14'. In the embodiment disclosed, the connection between the platform and the tensile load carrying member is effected such that the tensile load carrying member is passed through a hole in the platform and a locking member 17 around the tensile load member 14, 14' locks the platform by means of frictional action in relation to the tensile load carrying members. The lowest platform 16 is positioned in level with the lower edge of the door 7 to ensure easy entering into the tower. An intermediary platform 16' is arranged just above the door for protecting personal coming in through the door from possible falling items from platforms above. An upper platform 16" is arranged a short distance below the junction between the lower and upper tower sections 4, 5, for allowing personal to stand on a comfortably distance from the junction and draw the bolt connection 18 when mounting the upper tower section 5 onto the lower tower section 4.

In the lower end of each tensile load carrying member 14, 14', it is provided with a stretching screw 19, such that it can be prestressed between the upper and lower flanges 9, 10. In this way the tensile load carrying members 14, 14' as well as the equipment suspended from them, to some extent will be stabilized in the horizontal direction. To further prevent horizontal movements of the platforms 16, 16', 16", they are, at least in three separated positions distributed around the circumference of the platform, provided with buffer members 20 in the area between the platform and the inner surface of the jacket wall 6.

Reference is thereafter made to FIG. 3, in which is illustrated, in a longitudinal section, a tower section 4 which is identical with the one illustrated in FIG. 2, except that in FIG. 3 there are provided only two platforms but 16, 16' additionally also a ladder 21. The ladder is mounted to the upper as well as to the lower platform and can arbitrary be positioned adjacent the jacket wall 6 or in a more centrally position in relation to the platform. Both of these positions requires that an opening (not shown) of sufficient size is made in the upper platform for allowing a person to pass there through.

In order to stabilize the ladder 21 in the horizontal direction, two additional transversal tensile load carrying members 22, 22' are extended diagonally between two of the vertical tensile load carrying members 14, 14' and are attached to the ladder 21. It is to be understood that such transversal tensile load carrying members can be arranged in an arbitrary number and can have an arbitrary angle in relation to the vertical, accordingly even be strictly horizontal.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A tower for a wind turbine, comprising:
at least one tower section having a jacket wall and a pair of tower section flanges, a first of the pair of tower section flanges at an upper end of the at least one tower section and a second of the pair of tower section flanges at a lower end of the at least one tower section;
a platform positioned within one of the at least one tower sections;
a first plurality of flexible, tensile load carrying members that extend from the platform to the second of the pair of tower section flanges at the lower end, wherein the first plurality of flexible, tensile load carrying members include at least one of wires and chains; and
a ladder that is accessible via the platform and that extends downward from the platform.

2. The tower of claim 1, further comprising:
a second plurality of tensile load carrying members that support the platform from one of the pairs of tower section flanges that lies above the platform.

3. The tower of claim 2, wherein the second plurality of tensile load carrying members include a plurality of rods.

4. The tower of claim 2, wherein the second plurality of tensile load carrying members are flexible.

5. The tower of claim 2, wherein the second plurality of tensile load carrying members comprises at least one of chains and wires.

6. The tower of claim 1, wherein the ladder is also supported by one or more of the first plurality of flexible, tensile load carrying members.

7. The tower of claim 1, wherein the first plurality of flexible, tensile load carrying members include wires.

8. The tower of claim 1, wherein the first plurality of flexible, tensile load carrying members include chains.

9. The tower of claim 1, further comprising:
one or more buffers positioned between the platform and the jacket wall of the tower section.

10. The tower of claim 1 wherein the ladder is suspended from at least one of the platform, the first plurality of flexible, tensile load carrying members, and at least one of the pair of tower section flanges.

11. A tower for a wind turbine, comprising:
at least one tower section having a jacket wall and a pair of tower section flanges, a first of the pair of tower section flanges at an upper end of the at least one tower section and a second of the pair of tower section flanges at a lower end of the at least one tower section;
a platform positioned within the at least one tower section;
a plurality of tensile load carrying members that extend from the platform downward to the second one of the pair of tower section flanges at the lower end, wherein the plurality of tensile load carrying members are fixed to the second one of the pair of tower section flanges and comprises at least one of wires and chains; and
a ladder that is accessible via the platform and that extends downward from the platform.

12. The tower of claim 11, further comprising:
a plurality of upper tensile load carrying members that support the platform from one of the pairs of tower section flanges that lies above the platform.

13. The tower of claim 12, wherein the plurality of upper tensile load carrying members include a plurality of rods.

14. The tower of claim 12, wherein the plurality of upper tensile load carrying members are flexible.

15. The tower of claim 12, wherein the plurality of upper tensile load carrying members include chains.

16. The tower of claim 11, wherein the ladder is also supported by one or more of the plurality of tensile load carrying members.

17. The tower of claim 11, wherein the plurality of tensile load carrying members include chains.

18. The tower of claim 11, further comprising:
one or more buffers positioned between the platform and the jacket wall of the tower section.

19. The tower of claim 11, wherein the ladder is suspended from at least one of the platform, the plurality of tensile load carrying members, and at least one of the pair of tower section flanges.

20. A tower for a wind turbine, comprising:
at least one tower section having a jacket wall and an upper tower section flange at an upper end of the tower section and a lower tower section flange at a lower end of the tower section;
a platform positioned within the at least one tower section between the upper tower section flange and the lower tower section flange;
a plurality of upper tensile load carrying members that support the platform from the upper tower section flange;
a plurality of flexible, tensile load carrying members that extend between the platform to the lower tower section flange, the plurality of flexible, tensile load carrying members are fixed to the lower tower section flange and comprises at least one of chains and wires; and
a ladder that is supported by at least one of the platform and the plurality of flexible, tensile load carrying members, the ladder extending from the platform toward the lower tower section flange.

\* \* \* \* \*